US005899353A

United States Patent [19]
Sabin et al.

[11] Patent Number: 5,899,353
[45] Date of Patent: May 4, 1999

[54] ICE CREAM CONE CAKE HOLDER

[76] Inventors: Jeffrey Michael Sabin, 424 Burt Cir, Lewiston, N.Y. 14092; Darla Jane Clark, 4600 Hyde Park Blvd., Apt. 67, Niagara Falls, N.Y. 14305

[21] Appl. No.: 08/922,317

[22] Filed: Sep. 3, 1997

Related U.S. Application Data

[63] Continuation of application No. 08/478,836, Jun. 7, 1995, abandoned.

[51] Int. Cl.⁶ .................................................. B65D 1/36
[52] U.S. Cl. ........................... 220/507; 220/512; 220/572; 220/488; 220/528; 220/23.83; 206/562
[58] Field of Search ................................. 220/572, 512, 220/488, 571, 573.1, 573.3, 573.4, 575, 23.4, 23.6, 23.83, 23.86, 23.87, 23.91, 507, 509, 510, 515, 527, 528, 529, 625; 206/558, 562, 563, 758, 763, 764, 765

[56] References Cited

U.S. PATENT DOCUMENTS

| | | |
|---|---|---|
| D. 317,222 | 6/1991 | Dodge . |
| D. 321,968 | 12/1991 | Schindler et al. . |
| D. 340,343 | 10/1993 | Rizikow . |
| 347,665 | 8/1886 | Vail ......................... 220/572 |
| 930,890 | 8/1909 | Schlappich et al. ..................... 206/562 |
| 1,054,035 | 2/1913 | Ruhnau ................... 220/512 |
| 1,165,304 | 12/1915 | Whittaker ................. 206/562 |
| 1,176,932 | 3/1916 | Smith ....................... 206/562 |
| 1,257,119 | 2/1918 | Reynolds ................ 220/771 |
| 1,370,811 | 3/1921 | Harding et al. ......................... 229/932 |
| 1,628,718 | 5/1927 | Fritzche . |
| 1,674,209 | 6/1928 | Lord . |
| 1,699,765 | 1/1929 | Staples .................. 220/771 |
| 1,995,310 | 3/1935 | Kruger ..................... 220/512 |
| 2,210,521 | 8/1940 | Bemis ....................... 99/448 |
| 2,344,937 | 3/1944 | Brazier .................... 206/562 |
| 2,459,921 | 1/1949 | Comer ..................... 220/771 |
| 2,547,716 | 4/1951 | Murphy .................. 229/932 |
| 2,565,299 | 8/1951 | Erickson ................. 220/512 |
| 2,619,251 | 11/1952 | Schmidt .................. 220/771 |
| 2,892,561 | 6/1959 | Frank ....................... 220/771 |
| 2,981,039 | 4/1961 | Pohl ......................... 206/558 |
| 3,366,486 | 1/1968 | Weinstein et al. ...................... 426/138 |
| 3,566,776 | 3/1971 | Young et al. ............................. 99/426 |
| 3,643,812 | 2/1972 | Mander et al. ......................... 220/512 |
| 3,654,746 | 4/1972 | Beckers .................. 426/124 |
| 3,698,779 | 10/1972 | Holmes et al. . |
| 3,874,548 | 4/1975 | Buff .......................... 426/119 |
| 3,938,688 | 2/1976 | Ryan ........................ 220/771 |
| 4,002,773 | 1/1977 | Entenmann ............................ 426/128 |
| 4,039,797 | 8/1977 | Olsen ........................ 99/448 |
| 4,055,670 | 10/1977 | Belmont .................. 426/119 |
| 4,104,405 | 8/1978 | Forkner .................... 426/94 |
| 4,279,374 | 7/1981 | Webinger . |
| 4,291,805 | 9/1981 | Seeley . |
| 4,314,650 | 2/1982 | Cillario .................... 426/119 |
| 4,323,585 | 4/1982 | Manser .................... 426/128 |

(List continued on next page.)

FOREIGN PATENT DOCUMENTS

| | | |
|---|---|---|
| 114538 | 7/1969 | Denmark . |
| 1429322 | 1/1966 | France . |
| WO 89/05764 | 6/1989 | WIPO . |

*Primary Examiner*—Stephen Castellano
*Attorney, Agent, or Firm*—Richard C. Litman

[57] ABSTRACT

An ice cream cone cake holder comprises a supporting platform having a plurality of joined cone and/or cake supporting members and, preferably, a pair of handle members. Several embodiments of the holder are shown. In the first embodiment, the supporting platform is solid with apertured, open supporting members. In a second embodiment, the supporting platform is solid with apertured supporting members having connected frusto-conical members. In a third embodiment, the holder is wire-like with parallel, wire-like holder members with shaped portions that support ice cream cone cakes. The holder may be used in conjunction with a carrier for the holder and may hold an ice cream cone filled with cake ingredients, before during and after baking of the cake ingredients.

6 Claims, 5 Drawing Sheets

U.S. PATENT DOCUMENTS

| | | | |
|---|---|---|---|
| 4,349,109 | 9/1982 | Scordato et al. | 206/562 |
| 4,394,905 | 7/1983 | Hackenberg | 206/562 |
| 4,429,625 | 2/1984 | Nelson | 99/426 |
| 4,446,982 | 5/1984 | Corse | 220/512 |
| 4,488,654 | 12/1984 | Odsgard . | |
| 4,525,367 | 6/1985 | Allison | 426/138 |
| 4,583,955 | 4/1986 | Toloczko | 99/426 |
| 4,599,314 | 7/1986 | Shami | 206/563 |
| 4,653,392 | 3/1987 | Gerber . | |
| 4,677,906 | 7/1987 | Lowe | 220/23.87 |
| 4,867,315 | 9/1989 | Baldwin | 206/558 |
| 4,902,519 | 2/1990 | Ream et al. | 426/414 |
| 4,941,401 | 7/1990 | Sarnoff et al. | 220/23.87 |
| 4,974,502 | 12/1990 | Murdock | 99/450 |
| 5,057,282 | 10/1991 | Linder | 220/507 |
| 5,207,150 | 5/1993 | Wellman et al. | 99/439 |
| 5,306,513 | 4/1994 | Colucci et al. . | |
| 5,333,751 | 8/1994 | Santucci, Sr. | 220/512 |
| 5,392,914 | 2/1995 | Lemieux et al. | 206/562 |
| 5,450,785 | 9/1995 | Westbrooks | 99/426 |

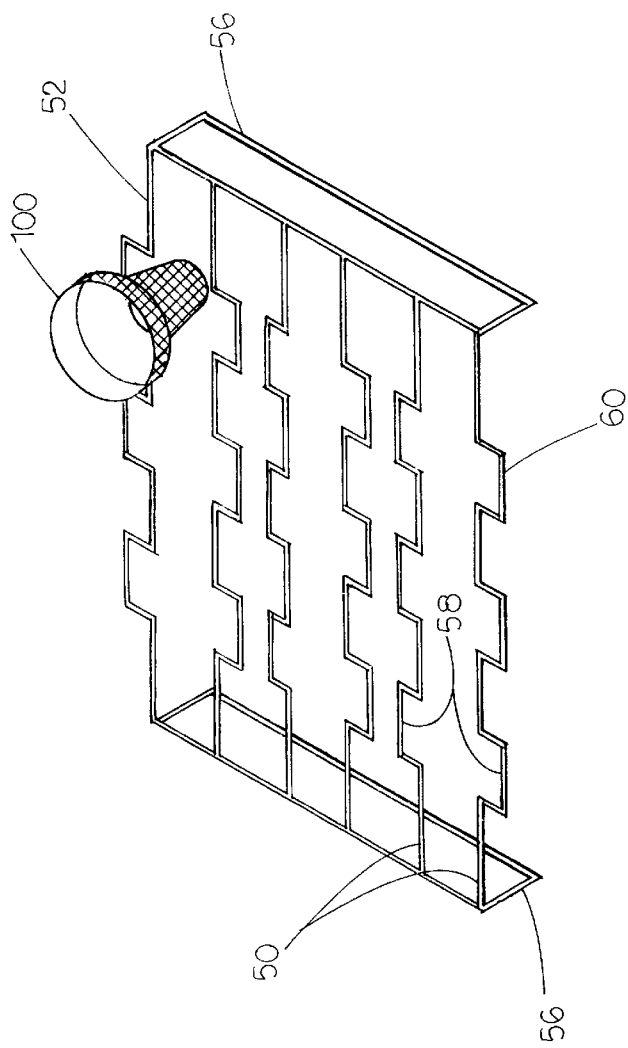
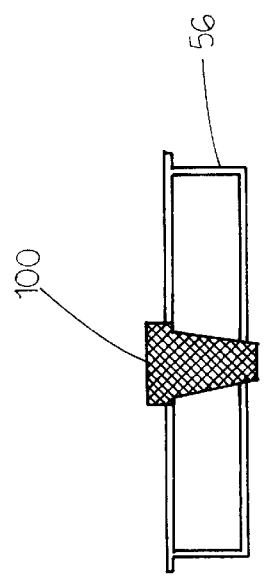
FIG. 5
FIG. 5A

ICE CREAM CONE CAKE HOLDER

CROSS REFERENCE TO RELATED APPLICATION

This application is a continuation of application Ser. No. 08/478,836 filed on Jun. 7, 1995, abandoned.

BACKGROUND OF THE INVENTION

1. Field of the Invention

The present invention relates generally to truncated, generally cylindrical food items and holders therefor during baking and transport, and more particularly to cone and cake combinations and holders therefor during baking and transport.

2. Description of the Prior Art

Ice cream cones and cupcakes have long been popular dessert items. Recently, it has become known to bake cupcakes within ice cream cones to form dessert items. These dessert items must be held and supported during baking to ensure complete baking and proper shape. Moreover, these dessert items tend to become ruined and inedible when toppled, before, during, or after baking. Numerous attempts have been made to provide supports for ice cream cones, cup cakes, and the like, which maintain correct orientation during baking and transportation, and prevent the cone or other food items from falling over. However, these prior attempts have failed to provide a fully satisfactory solution to the problem of incorrectly oriented ice cream cones, and moreover these prior attempts do not present a combination of cone, cake, baking holder, and carrier.

U.S. Pat. No. 1,628,718, issued to Carl E. Fritzche, on May 17, 1927, describes an ice cream cone wrapper and carrier having support apertures in a cross member, for supporting a plurality of ice cream cones. There is also a surrounding container that protects the ice cream cones. Because there is only a single line of apertures, the device of this patent consumes a relatively large volume per aperture. Additionally, there is no provision in this patent for a combination of cone, cake, baking holder, and carrier.

U.S. Pat. No. 1,674,209, issued to Chester R. Lord, on Jun. 19, 1928, describes an ice cream cone receptacle including a box and apertured cross member that supports ice cream cones. The box has a handle. The cross member is integral with the box, making the cross member unremovable. Additionally, there is no provision in this patent for a combination of cone, cake, baking holder, and carrier.

U.S. Pat. No. 3,6984,779, issued to Raymond W. Holmes et al., on Oct. 17, 1972, describes a container for displaying and shipping food. The container has a plurality of trays supported by a central spindle. There is no provision for supporting upright ice cream cones. Additionally, there is no provision in this patent for a combination of cone, cake, baking holder, and carrier.

U.S. Pat. No. 4,279,374, issued to George Webinger, on Jul. 21, 1981, describes a tray for supporting food, such as pizza, during heating. The tray has apertures for allowing steam to escape during heating of the food. There is no provision for supporting upright ice cream cones. Additionally, there is no provision in this patent for a combination of cone, cake, baking holder, and carrier.

U.S. Pat. No. 4,291,805, issued to Leonard Seeley, on Sep. 29, 1981, describes an ice cream tray formed from plastic in a unitary construction and having three indentations configured for receiving and supporting ice cream cones. These indentations prevent tipping of the cones. The tray of this patent supports only a bottom tip of an ice cream cone, making breakage a problem of significant likelihood. There is no provision for supporting cupcakes or for providing ventilation of ice cream cones (before insertion of ice cream) or cupcakes during baking. Additionally, there is no provision in this patent for a combination of cone, cake, baking holder, and carrier.

U.S. Pat. No. 4,488,654, issued to Peter Odsgard, on Dec. 18, 1984, describes a stand and carrier for conical objects such as ice cream cones. The device of this patent has a relatively complicated mechanism for both a stand and a folding carrier for carrying ice cream cones and cup-shaped objects. The foldability of material used in the carrier argues against use in baking, since easily foldable materials are typically unsuitable for use at high temperatures. Additionally, there is no provision in this patent for a combination of cone, cake, baking holder, and carrier.

U.S. Pat. No. 4,653,392, issued to Bernard V. Gerber, on Mar. 31, 1987, describes a muffin baking pan having a detent for producing a cavity in a muffin. There is no provision in this patent for supporting a plurality of ice creams cone cakes.

U.S. Pat. No. 5,306,513, issued to Joyce Colucci et al., on Apr. 26, 1994, describes rolled-dough cones. There is no provision in this patent for supporting a plurality of ice creams cone cakes.

U.S. Design Pat. No. Des. 317,222, issued to John E. Dodge, on Jun. 4, 1991, shows an adjustable ice cream cone holder that holds only a single ice cream cone. There is no provision in this patent for a combination of cone, cake, baking holder, and carrier.

U.S. Design Pat. No. Des. 321,968, issued to John Schindler et al., on Dec. 3, 1991, shows an ice cream cone cover that covers only a single cone. There is no provision in this patent for a combination of cone, cake, baking holder, and carrier.

U.S. Design Pat. No. Des. 340,343, issued to Mauricio Rizikow, on Oct. 19, 1993, shows an ice cream cone holder that holds only a single cone. There is no provision in this patent for a combination of cone, cake, baking holder, and carrier.

Danish Patent Document No. 114,538, issued to Borge Andreas Ravn, on Jul. 7, 1969, describes an ice cream cone carrier constructed of structurally flimsy material so as to fold into a carrying configuration. If constructed of sturdy, solid material, as is the present invention, the device of this patent would not function as described. Additionally, there is no provision in this patent for a combination of cone, cake, baking holder, and carrier.

French Patent Document No. 1,429,322, issued to Cartonneries de Saint-Germain, on Jan. 17, 1966, describes a cup holder having pop-out handles and meant to be used with closed yogurt containers. The holder of this patent does not have a support structure suitable for use with ice cream cone cakes. Additionally, there is no provision in this patent for a combination of cone, cake, baking holder, and carrier.

PCT Patent Document No. WO 89/05764, issued to Roger Hassevelde et al., on Jun. 29, 1989, describes a device for wrapping an packaging an ice cream cone. The device holds only a single ice cream cone, and is not configured to hold an ice cream cone cake during baking.

None of the above inventions and patents, taken either singly or in combination, is seen to describe the instant invention as claimed.

SUMMARY OF THE INVENTION

An ice cream cone cake holder according to the present invention comprises support platform having a plurality of joined cone supporting members and, preferably, a pair of handle members. The supporting members are arranged in rows which are offset or staggered with respect to one another to allow dense packing. Thus, each row of supporting members inter-engages with an adjacent row, thereby reducing overall volume taken by the cone supporting members. The term, "inter-engaging," as used in this application, refers to close arrangement of staggered or offset rows of supporting members, much the way fingers of a pair of hands can be inter-locked. The supporting platform is one of: solid with apertured, open supporting members; solid with apertured, closed supporting members; and wire-formed with open, wire-formed support members. The holder may be used in conjunction with a carrier for the holder.

Accordingly, it is a principal object of the invention to support ice cream cone cakes, before, during, and after baking.

It is another object of the invention to provide a convenient way to carry a plurality of ice cream cone cakes.

It is a further object of the invention to provide ventilation to ice cream cone cakes during baking of the ice cream cone cakes.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is an environmental, perspective view of a third embodiment of the present invention, without the carrier and showing square support openings, shown with an ice cream cone in place in a support member.

FIG. 5A is a side elevational view of the third embodiment of present invention, shown with an ice cream cone in place in a support member.

Similar reference characters denote corresponding features consistently throughout the attached drawings.

DETAILED DESCRIPTION OF THE PREFERRED EMBODIMENTS

The present invention provides ice cream cone cake holders that can be used both during baking and during transport of ice cream cone cakes. An open design facilitates air circulation, while inter-engaging orientation of supporting members minimizes space taken by the supporting members. The holders have handle members that enable easy removal and placement of the holders in a box, while also ensuring a snug fit of the holders in the box.

Figure 1:
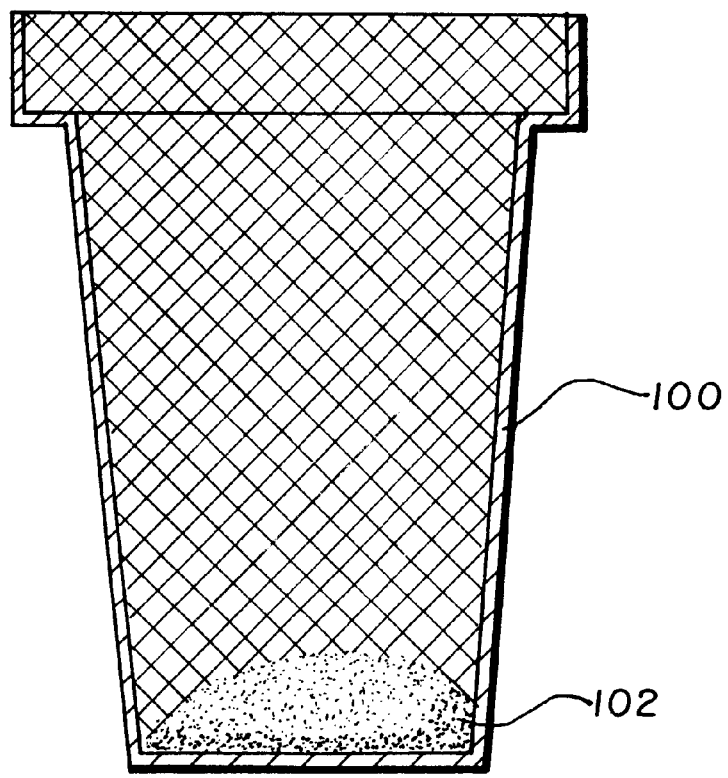
FIG. 1 is a cross section view of an ice cream cone with cake ingredients inside, prior to baking.
Figure 2:
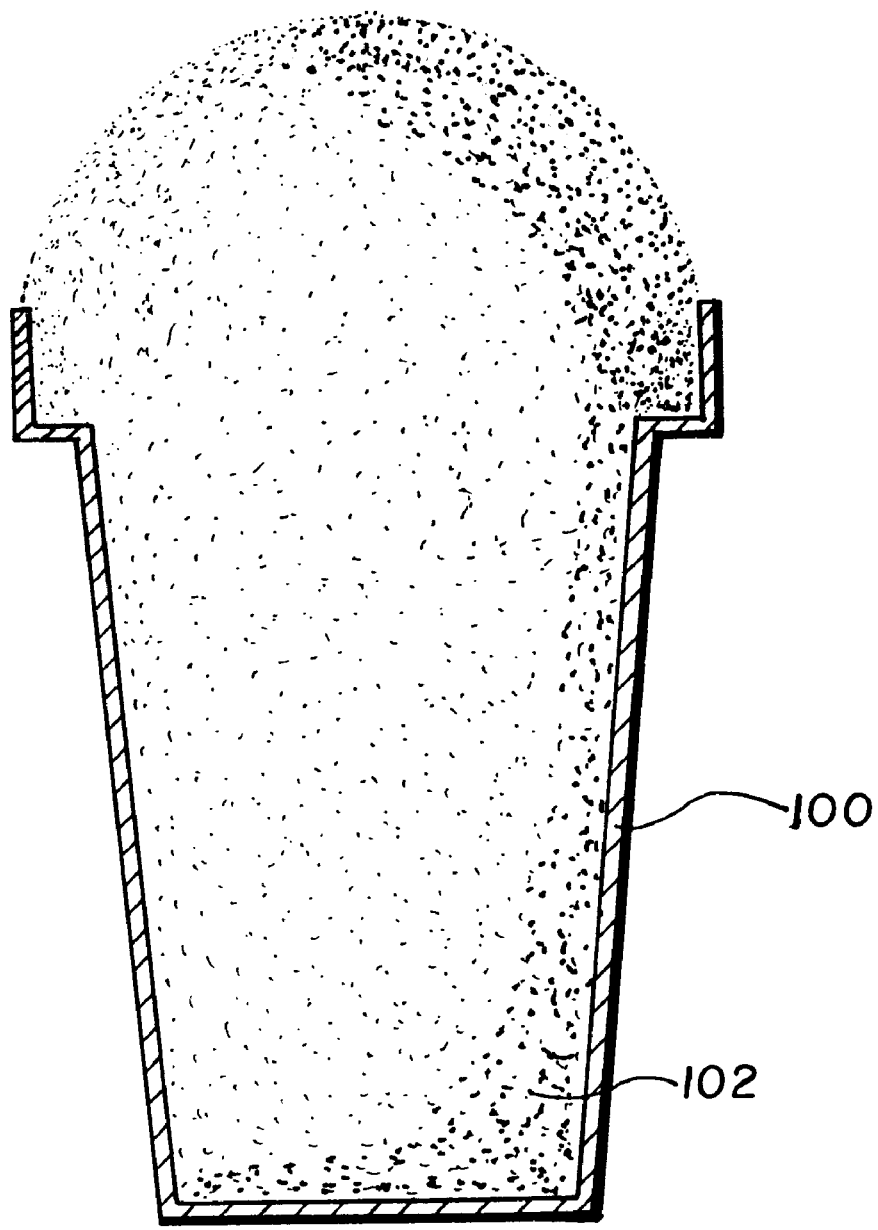
FIG. 2 is a cross section view of an ice cream cone with cake inside, subsequent to baking.

Referring to the drawings, FIGS. 1 and 2 show an ice cream cone cake of the prior art. FIG. 1 shows the ice cream cone prior to baking when ice cream cone 100 is partially filled with conventional cake ingredients 102. The ice cream cone 100 is then baked, following standard procedure used for baking the cake ingredients 102 filled inside the ice cream cone 100. As a consequence of baking, the cake ingredients expand to completely fill the ice cream cone 100, as shown in FIG. 2.

Figure 3:
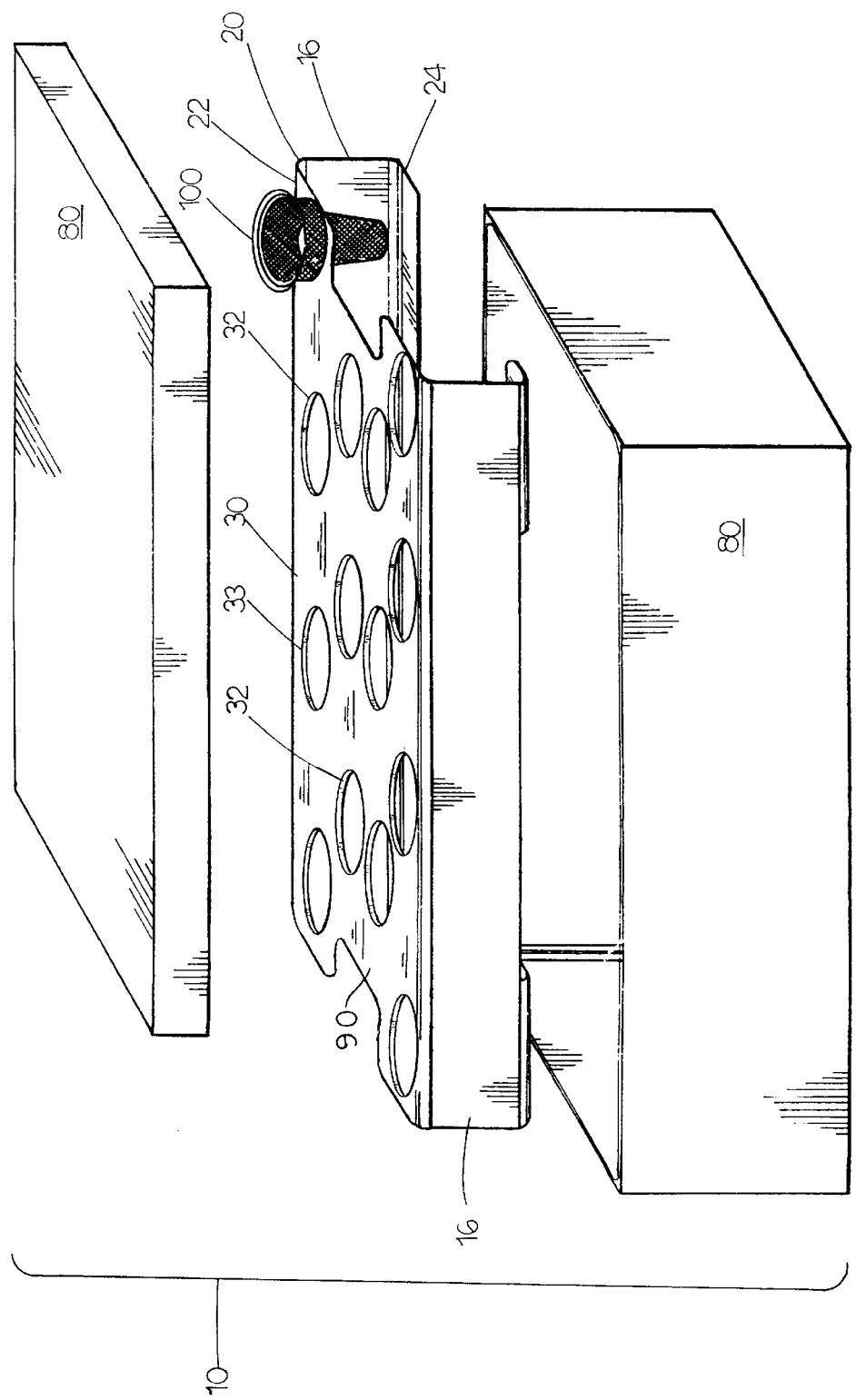
FIG. 3 is an environmental, exploded, perspective view of a first embodiment of the present invention, including a carrier and showing rounded support openings with a conventional ice cream cone in one of the support members.

Before, during, and after baking, it is highly desirable that the ice cream cone cake be supported in an upright orientation. Several holders that fulfill this need have been devised for use in combination with the ice cream cone cake. A first embodiment of an ice cream cone cake holder 10 according to the present invention is shown in FIG. 3. This first embodiment has a flat, generally rectangular support platform 30 and a plurality of support members 32 disposed in the support platform 30. These support members 32 have apertures 33 and rows of these support members 32 inter-engage with adjacent rows. The term, "inter-engaging," as used in this application, refers to close arrangement of staggered or offset rows of support members 32, much the way fingers of a pair of hands can be inter-locked. There are at least two leg members 16 that elevate the support platform 30 a predetermined amount, preferably about two to six inches. These leg members 16 are shaped like L's, with a top 20 of each "L" 16 connected to an edge 22 of the support platform 12, and a bottom 24 of each "L" 16 resting on whatever surface the holder 10 may be placed.

Figures 4, 4A:
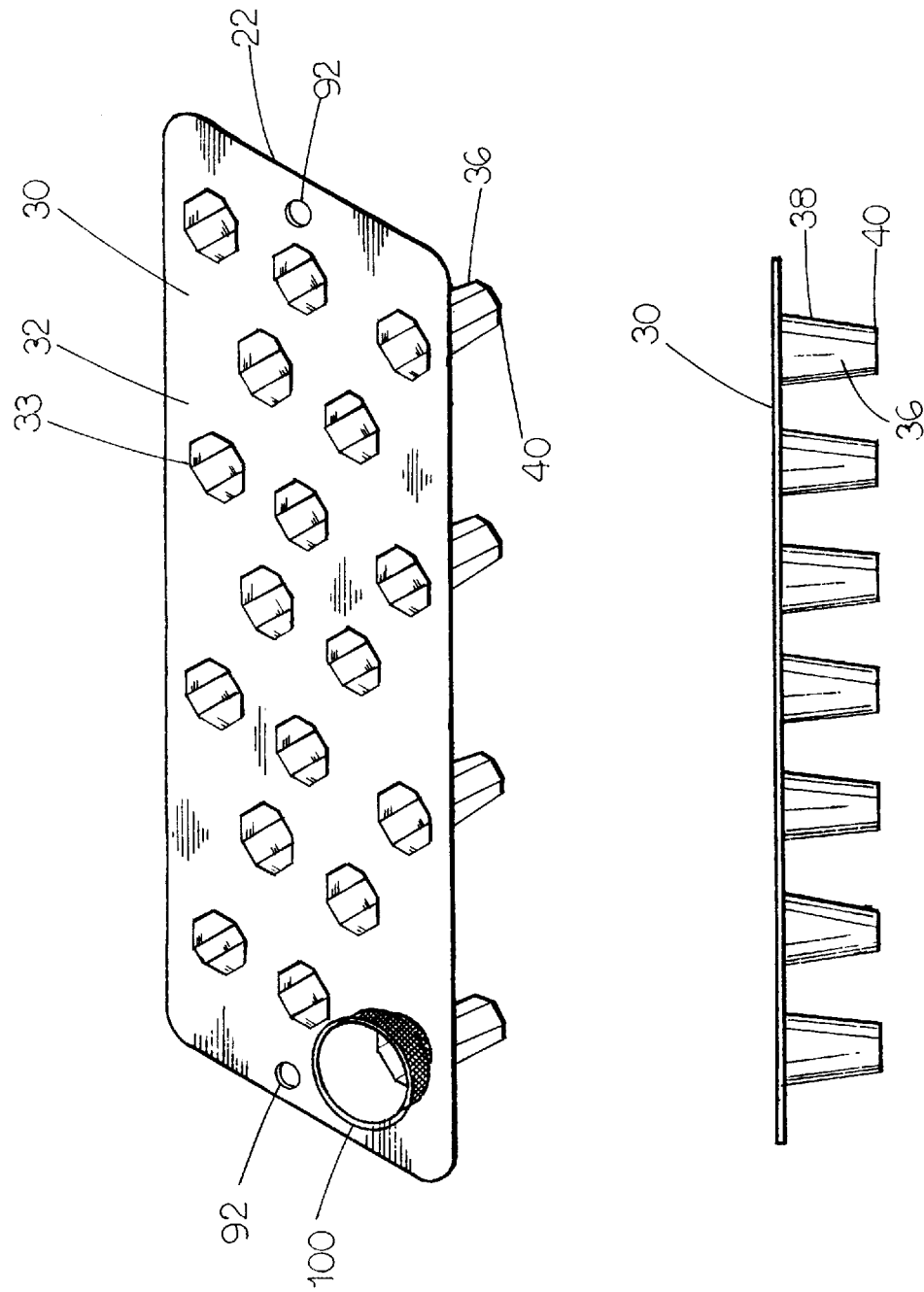
FIG. 4 is an environmental, perspective view of a second embodiment of the present invention, without the carrier and showing hexagonal support openings with an ice cream cone in one of the support members.
FIG. 4A is a side elevational view of the second embodiment of the present invention.

A second embodiment of the invention is shown in FIGS. 4 and 4A. This second embodiment, like the first embodiment, has a flat, generally rectangular support platform 30 and a plurality of support members 32 disposed in the support platform 34. Each support member 32 has an aperture 33. The support members 32 are preferably inter-engaging as in the first embodiment. The second embodiment differs from the first embodiment in that the second embodiment further includes frusto-conical members 36, these frusto-conical members 36 each having a larger end 38 and a smaller end 40, each larger end 38 being connected to one of the support members 32 at the apertures 33 of the support members 32. The term frusto-conical member, as used in this application, refers to a tube-like member that has a larger end and a smaller end and is shaped in cross section generally like the aperture 33 to which the larger end is attached. The smaller end 40 may be either closed or open. When the smaller end 40 is closed, an ice cream cone cake 100 held within a support member 32 is fully supported and contained at the smaller end 40. When the smaller end 40 is open, there is greater opportunity for vapor release from an ice cream cone cake 100 held within a support member 32 during baking. Each aperture 33 has a particular shape, such as square, circular, and hexagonal; many other shapes are possible. The shape is preferably configured to fit the ice cream cone cake 100 placed on the support members 32. For instance, an aperture 33 for a support member 32 intended to hold a conventional ice cream cone 100 should be large enough to hold such an ice cream cone 100.

A third embodiment of the invention, shown in FIGS. 5 and 5A, has a plurality of pairs 50 of wire-like holder members 52, each wire-like holder member 52 being oriented substantially parallel to each other wire-like holder member 52, with each pair 50 having means 54 for supporting an ice cream cone cake 100. There is also a pair of wire-like base members 56 supporting said holder members 52. The means 58 for supporting an ice cream cone cake 100 is preferably a pair 58 of opposing shaped portions 60, each shaped portion 60 being integral with said wire-like holder members 52, with each pair 58 of opposing shaped portions 60 being disposed in a pair 50 of wire-like holder members 52. The means for support 54 can be inter-engaging, like the support members 32 of the first embodiment. Other means for support could be used, such as built-up, apertured support plates disposed on the wire-like holder members 52. If shaped portions 60 are used as the means 58 for support, the shaped portions 60 have a shape, preferably chosen to be square, circular, or hexagonal, although many other shapes are possible. All shaped portions 60 disposed in a particular ice cream and cupcake holder 10 can be a single shape, or there can be a variety of shapes in a single holder 10.

For any of the three embodiments, there is a releasably closable carrier box 80 dimensioned and configured to surround the support platform 30 or the wire-like holder members 52 and wire-like base members 56. The carrier box 80 preferably fits snugly around the platform 30 or the holder members 52 to minimize space occupied by the carrier box 80. The carrier box 80 ensures that matter supported by the support platform 30 or the holder members 52 is protected and that carrying of ice cream cone cakes 100 supported by the support platform 30 or the holder members 52 is facilitated. There are also handle members, these handle members being at least two notches 90 disposed in edges 22 of the support platform 30, or at least two grasping apertures 92 disposed near edges 22 of the support platform 30, whereby lifting of the support platform 30 from the carrier box 80 and placing the support platform 30 in the carrier box 80 are facilitated. In the case of the third embodiment, holding of the ice cream cone cake holder 10 is possible by gripping the wire-like holder members 52.

It is to be understood that the present invention is not limited to the embodiments described above, but encompasses any and all embodiments within the scope of the following claims.

We claim:

1. An ice cream cone cake holder, comprising:

a flat, generally rectangular support platform having a periphery, said platform having a plurality of support apertures passing therethrough, said support apertures arranged in a plurality of staggered rows, said platform having therein opposing lifting apertures including two notches formed in the periphery; and two opposing L-shaped legs including a vertical member connected to shorter horizontal member, said vertical member depending from the periphery of said platform.

2. The ice cream cone cake holder according to claim 1, further including frusto-conical members, said frusto-conical members each having a larger end and a smaller end, said larger end being connected to said support platform at said support apertures.

3. The ice cream cone cake holder according to claim 2, wherein said larger end is open and said smaller end is closed.

4. The ice cream cone cake holder according to claim 2, wherein said larger end and said smaller end are open.

5. The ice cream cone cake holder according to claim 1, wherein each of said support apertures has a shape, said shape being selected from the group consisting of square, circular, and hexagonal.

6. The ice cream cone cake holder according to claim 1, further including a releasably closable carrier box dimensioned and configured to snugly surround said support platform, whereby ice cream cone cakes supported by said support platform are protected and carrying of ice cream cone cakes supported by said support platform is facilitated.

* * * * *